(12) United States Patent
Hahn

(10) Patent No.: US 6,676,226 B2
(45) Date of Patent: Jan. 13, 2004

(54) WHEEL END SYSTEM

(75) Inventor: Steven C. Hahn, Shelby Township, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/116,632

(22) Filed: Apr. 4, 2002

(65) Prior Publication Data

US 2003/0189374 A1 Oct. 9, 2003

(51) Int. Cl.[7] ............................................. B60B 35/00
(52) U.S. Cl. ..................................... 301/105.1; 301/131
(58) Field of Search ........................... 301/105.1, 124.1, 301/126, 131, 132; 384/544; 180/258, 259

(56) References Cited

U.S. PATENT DOCUMENTS

| | | | | |
|---|---|---|---|---|
| 3,099,491 A | * | 7/1963 | Peras | |
| 4,493,388 A | * | 1/1985 | Welschof et al. | 180/258 |
| 4,943,071 A | * | 7/1990 | Srebot et al. | 279/43 |
| 5,100,247 A | * | 3/1992 | Woehler | 384/544 |
| 6,174,090 B1 | * | 1/2001 | Huang | 384/537 |
| 6,318,533 B1 | * | 11/2001 | Krisher | 192/69.41 |

* cited by examiner

Primary Examiner—Russell D. Stormer
(74) Attorney, Agent, or Firm—Mick A. Nylander

(57) ABSTRACT

A wheel end for use in a vehicle wherein the wheel end includes a side shaft wherein the side shaft having an appendage on one end thereof. The side shaft having a cylindrical cavity at a center point of the appendage. The wheel end unit also includes a spindle arranged around the appendage. A knuckle is arranged around a portion of the spindle and a portion of the side shaft. The wheel end also includes a fastener secured between the spindle and the appendage to ensure a robust connection between the spindle and the appendage.

14 Claims, 3 Drawing Sheets

WHEEL END SYSTEM

BACKGROUND OF THE INVENTION

The present invention relates generally to wheel end systems for use in a vehicle, and more particularly relates to a wheel end disconnect system for use in an automotive vehicle.

DESCRIPTION OF RELATED ART

Torque distribution systems in automotive vehicles have been known for many years. The torque distribution systems are designed for a variety of different vehicles such as rearwheel drive vehicles, front wheel drive vehicles, and even four wheel or all wheel drive vehicles, in the latter two configurations the front wheels and/or the rear wheels are engaged to be driven by the drivetrain as required. In an all wheel drive or four wheel drive vehicle torque maybe delivered to a wheel at a fixed percentage or in an on demand manner. There are currently known many types of engagement systems that will engage a wheel to the drivetrain thus sending torque to the wheel. In four wheel drive systems generally one axle either the front or rear is the primary driven axle. In most cases the rear axle is the primary driven axle. The front axle is engaged and is the recipient of torque or power when need be or at a fixed percentage generally well below that of the rear primary driven axle. Some of these engagement systems engage the front wheels of a four wheel drive system only when the front axle is under power from the drivetrain system and systematically disengage the wheels when the front axle is idle and is not needed to deliver power for the vehicle. The disengagement of the front wheels from the front axle and drivetrain system will prevent deliberate rotation of the front axle as a result of the front wheels being driven as the vehicle is propelled.

Many prior art wheel end disconnect systems are primarily used in four wheel drive vehicles and can be used in either a front wheel or a rear wheel of a four wheel drive drivetrain system depending on which wheel is the primary driven axle. Many of these four wheel drive vehicles have a disconnect hub system where the vehicle has a support coupled to the frame of the vehicle defining a bearing for the hub and the wheel is mounted laterally outward on the vehicle from the support. These prior art disconnect hub systems generally are mounted laterally outward from the support within the confines of the center of the wheel. These prior art devices also have units which extended laterally outward beyond the vehicle to house the operating mechanism necessary to provide the disconnect feature to the wheel end. These parts generally have reduced diameters thus requiring heavier elements to transmit the necessary torque to the wheel under the driving conditions. Furthermore, these prior art systems have expensive design considerations such as bearing sets and supports needed to have the hubs operate under all on and off road vehicle conditions while also being cognizant of vehicle operators desire for better gas mileage and quieter operation. The prior art systems also have a problem with the side shaft connection to the wheel hub or spindle. Generally, a long extension is used to insert into a spindle and then the long extension is secured in a clip to the spindle. This long extension creates increased weight and also difficulty in inserting the wheel end unit onto the side shaft of the vehicle because of the angles and limited space available for installation procedures during manufacture of the vehicle.

Therefore, there is a need in the art for an improved wheel end disconnect system that reduces the weight of the wheel end disconnect system while also supplying stronger and more robust parts that reduce the complexity and time necessary for installation into the wheel end system for the drivetrain of a vehicle.

SUMMARY OF THE INVENTION

One object of the present invention is to provide an improved wheel end system for a vehicle.

Another object of the present invention is to provide an improved side shaft having a reduced neck portion extending from one end thereof.

Still another object of the present invention is to provide a wheel end disconnect system that is easier to install, has a reduction in weight and provides for a more robust system and connection to a side shaft.

Still another object of the present invention is to provide a more simplified connection device between the side shaft of the drivetrain system and the spindle or wheel hub of the automotive vehicle.

To achieve the fore going objects a wheel end for use in a vehicle is disclosed. The wheel end includes a side shaft wherein the side shaft has an appendage on one end thereof. The side shaft also includes a cylindrical cavity in the appendage. The wheel end also includes a spindle arranged around the appendage. A knuckle is arranged around a portion of the spindle and a portion of the side shaft. The wheel end includes a fastener secured between the spindle and the appendage. The fastener of the wheel end is a shoulder bolt.

One advantage of the present invention is a new and improved wheel end disconnect system for use in a vehicle.

Another advantage of the present invention is a wheel end system that has reduced weight.

Still another advantage of the present invention is a wheel end system that reduces installation time and complexity for manufacturers.

Still another advantage of the present invention is a more robust connection between a side shaft and the wheel end unit.

Still another advantage of the present invention is the reduced costs for the side shaft end.

Other objects, features and advantages of the present invention will become apparent from the subsequent description and the appended claims, taken in conjunction with the accompany drawings.

BEST MODE OF CARRYING OUT THE INVENTION

Figure 1:
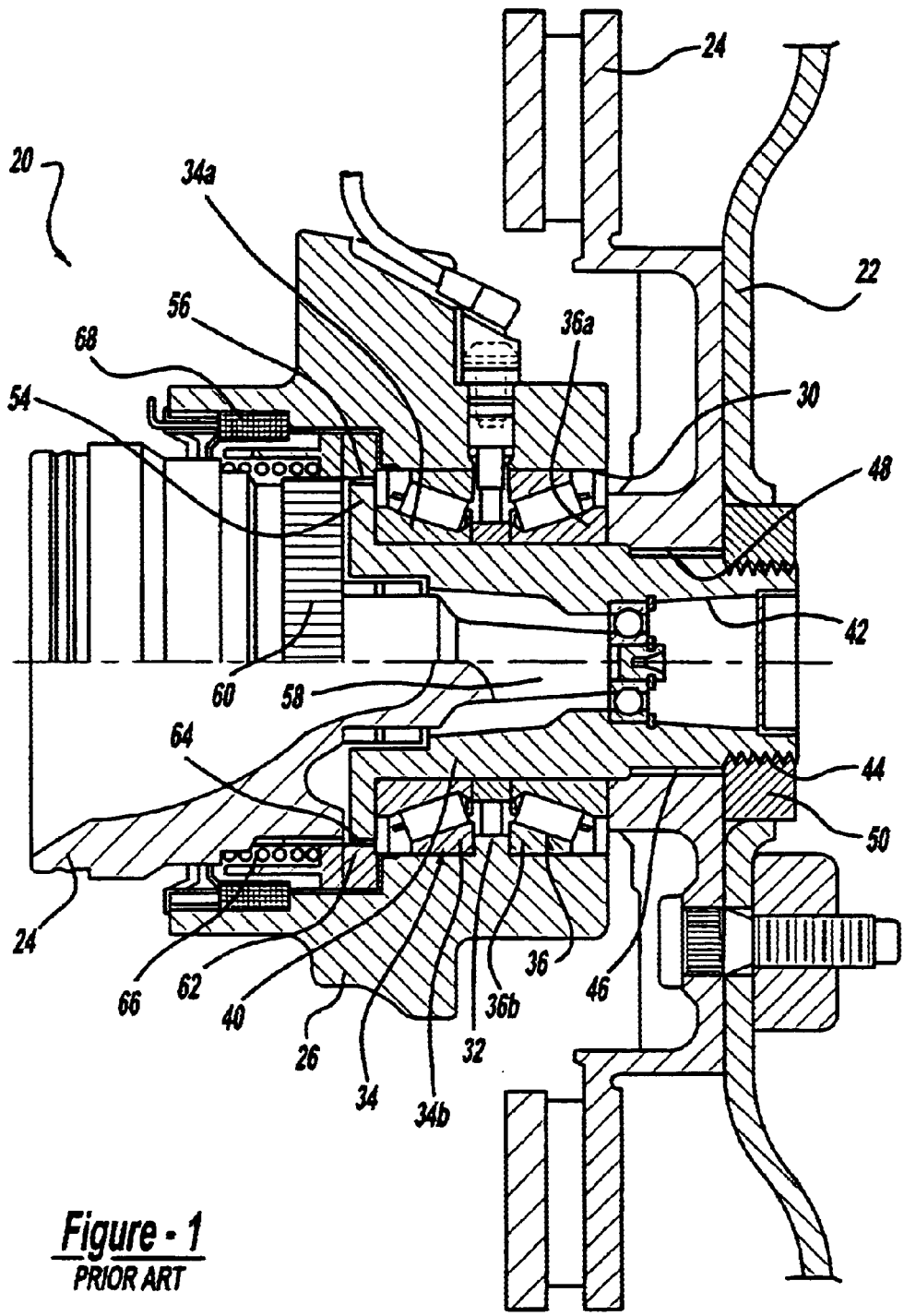
FIG. 1 shows a cross section of a prior art wheel end system.

Referring to the drawings, a wheel end 10 for use on a vehicle is shown according to the present invention. Generally, a vehicle works when an engine sends power to a transmission which is then transferred to a transfer case and then distributed appropriately to either the front prop shaft or the rear prop shaft. From the front or rear prop shaft the power is transmitted to the front or rear differential and then onto the appropriate side shafts. Finally, the power is transferred onto the wheels through the wheel end units. Any number of configurations can be used for a drivetrain system such as torque being sent to only the front or rear axle, to both at a fixed percentage or one axle may be a hang on axle only receiving power when the other axle is in a slip condition. Furthermore, the transfer case generally is connected via a shift mechanism, that is operated by an operator of the automotive vehicle through any known selector, to provide power to or turn power off to the front wheels or rear wheels depending on the vehicle configuration. This will allow the vehicle to be operated in a two wheel drive mode which will provide better gas mileage and less wear and tear on the vehicle tires or in four wheel drive where all of the wheels receive power for off road or hazardous driving conditions. Generally, this two wheel or four wheel drive selection is done by shift selection through the transfer case of the automotive vehicle drivetrain system.

FIG. 1 shows a prior art wheel end unit 20 that includes a wheel 22 secured to a wheel mounting rotor 24. The wheel mounting rotor 24 is mounted on the vehicle by an integrated wheel end unit 20. The steering support or knuckle 26 is coupled to a vehicle frame through a suspension structure (not shown). A side shaft 28 is connected at its outer end to the wheel end unit 20. The side shaft 28 rotatably operates with the front differential of the vehicle (not shown). The steering support 28 has an internal cylindrical bore 30 defining a bearing enclosure. A circumferential rib 32 is formed intermediate of the ends of the bore 30.

A first and second roller bearing assembly 34, 36 is mounted and supported by the bearing enclosure wherein one bearing assembly 34 is on one side of the rib 32 and the other bearing assembly 36 is on the opposite side of the rib 32. The bearing assemblies 34, 36 generally have an inner bearing race 34a, 36a and an outer bearing race 34b, 36b and have a plurality of rollers 38 rotatably arranged between the inner and outer races 34a, 34b of the bearing surfaces. This type of bearing system is standard and commercially available for wheel end units. A spindle 40 is rotatably supported and arranged within the inner bearing support portions of the inner races of the bearing 34, 36. The spindle 40 generally is a hollow tubular member having an inner bore 42. The spindle 40 includes an outer end portion that includes a plurality of threads 44 on its outer most end. A plurality of teeth 46 on an outer surface thereof are spaced about the periphery of the spindle 40 adjacent to the threads 44.

The wheel mounting rotor 24 has a splined bore 48 extending therethrough. The splines in the bore 48 engage with the teeth on the spindle 40, such that when the wheel mounting rotor 24 is mounted on the spindle 40 it is rotatably secured with relation thereto. A mounting nut 50 is screwed on to the threads 44 and secures the wheel mounting rotor 24 on the outer end portion of the spindle 40. The wheel 22 is then secured to the wheel mounting rotor 24 by a lug and nut combination 52 so that the wheel 22 will rotate with the wheel mounting rotor 24. On the opposite end of the spindle 40 or the inner end, a circular flange 54 expands radially outward beyond the outer diameter of the central portion of the spindle 40. The outer end of the circular flange 54 has a plurality of teeth 56 on an outer periphery thereof. The spindle 40 is free to rotate within the steering support 26 of the automotive vehicle. The side shaft 28 directly extends from the front differential and has an end portion 58 that is smaller in diameter than the internal bore of the spindle 40 and extends axially into the spindle 40. This end portion or appendage 58 is rotatably supported between the bore 42 of the spindle 40 and the end portion 58 of the side shaft 28. Thus, the side shaft 28 and spindle 40 have a substantially common axis of rotation which coincides with central axis of the wheel 22. The side shaft 28 has a plurality of teeth 60 about its peripheral edge that are substantially common in shape and spacing with the teeth 56 on the edge of the flange of the spindle 40.

A cylindrical ring gear 62 includes a plurality of inwardly directed engaging teeth 64 which are sized and positioned to mesh and interact with the teeth on the side shaft 28 and flange of the spindle 40. The ring gear 64 is axially slideable within the assembly. The ring gear 64 is capable of sliding such that it engages both the teeth of the spindle 40 and the side shaft 28. The axial movement of the ring gear 74 is provided by a prior art compression spring 66 and an electro magnetic actuator 68.

Figure 2:
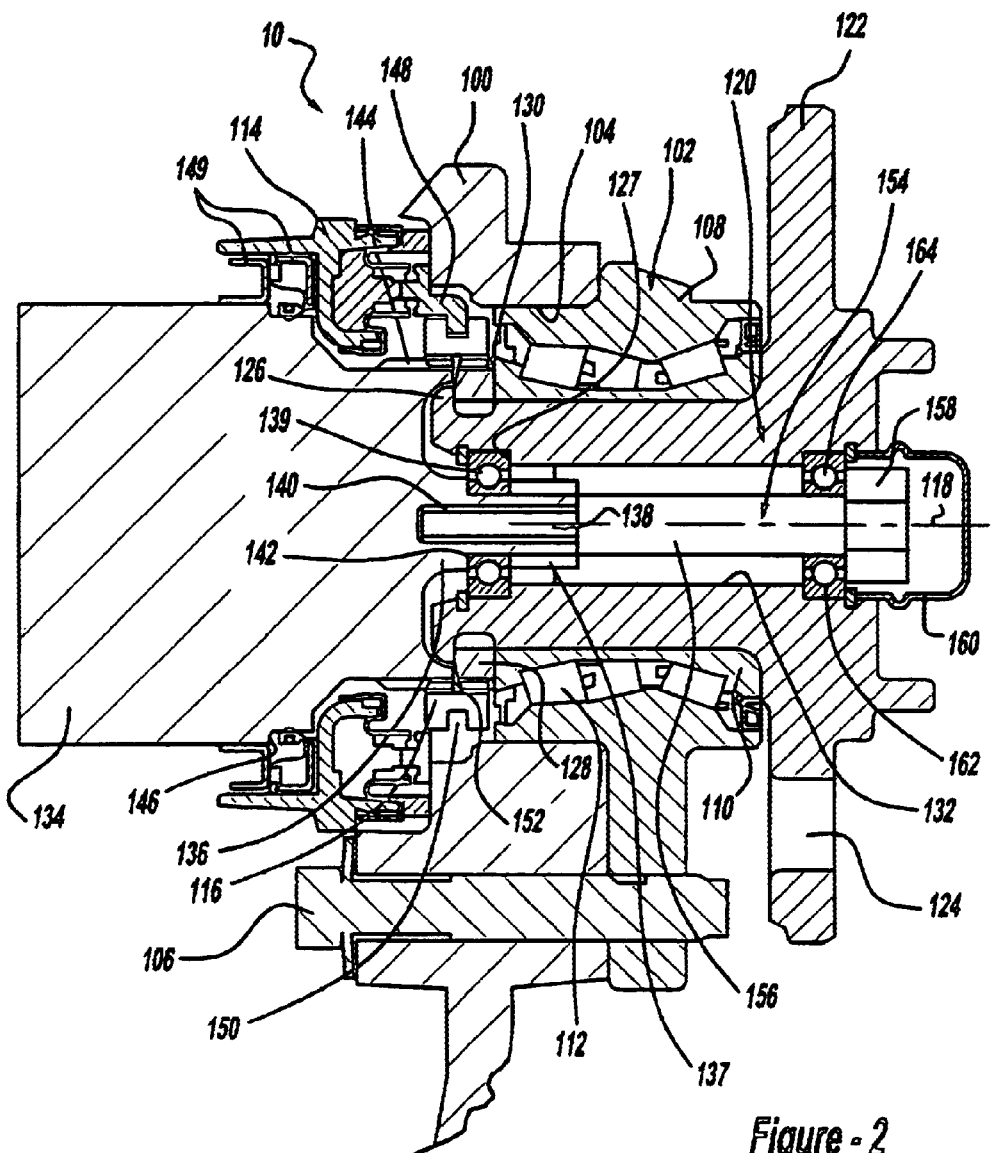
FIG. 2 shows a cross section of an embodiment of a wheel end system according to the present invention.

FIG. 2 shows a cross section of a wheel end unit 10 according to the present invention. A steering knuckle or steering support 100 is mounted to the vehicle frame or a vehicle suspension system (not shown). A roller bearing assembly 102 is mounted and supported by an inside bearing surface 104 of the steering support 100. The bearing assembly 102 is mounted to the steering support 100 via any known means, but in one embodiment a bolt with a locking tab 106 is used. The bearing assembly 102 includes an outer race 108 and inner race 110 with the outer race 108 being in contact with the steering support 100. Rotatably arranged between the outer race 108 and inner race 110 are a plurality of roller bearings 112 or any other known bearing capable of use in the wheel end environment. An actuator mechanism 114 is engaged with and secured to the steering support 100 on an inwardly facing surface of the steering support 100. The actuator mechanism 114 includes an actuator ring 116 which is capable of axial movement along the axis 118 of the wheel end unit 10. Any known actuator means can be used to facilitate the axial movement, such as but not limited to electro magnetic actuator, a solenoid actuator, mechanical actuator, electro mechanical actuator or any other type of actuator.

A spindle 120 having a generally cylindrical shape is received and supported within the inner race 110 of the bearing assembly 102. The spindle 120 shown in FIG. 2, includes a wheel hub or wheel rotor assembly 112 integrated on the outward extending end thereof. The wheel hub 122 has a plurality of orifices 124 therethrough, which allow for lugs to be used to attach a wheel to the wheel hub 122. The spindle 120 has on an interior portion thereof a ring like outward extending surface 126. The spindle 120 also includes a spline ring gear 128 in contact with the outward surface 126 of the spindle 120. The spline ring gear 128 includes a plurality of teeth 130 on its outer circumference equally spaced about such circumference. The spindle 120 has a hollow tubular like inner bore 132. A shoulder 127 is located near the end of the spindle 120 having the outward surface 126. Directly adjacent to the inner portion of the spindle 120 is located a side shaft 134 of the drivetrain system.

The end of the side shaft 134 includes a cylindrical like appendage or neck portion 136 extending from a center point of the side shaft 134 end. The appendage 134 includes a cylindrical shaped cavity 138 through a center portion of the appendage 136 which also coincides with the central axis 118 of the wheel end unit 110. The inner surface of the cylindrical cavity 138 has a plurality of threads 140 thereon. The cylindrical cavity 138 is a predetermined depth within the side shaft 134 end determined by the force necessary to secure and hold the side shaft 134 to the spindle/hub unit 10. The appendage 136 has a reduced radius portion 137 at the end thereof. A radailly inward surface 139 is formed where the reduced radius portion 137 begins. The appendage 136 extends within the hollow inner bore 132 of the spindle 120 on the inner end of the spindle 120. The appendage 136 is rotatably supported within the spindle 120 by a bearing 142 of any known type. In one embodiment a roller bearing 142 is used. The roller bearing 142 engages the shoulder 127 and the inward surface 139. The roller bearing 142 also is in contact with a securing ring 141, which is arranged in a channel on an inside surface of the spindle 120. The end of the side shaft 134 generally has a cylindrical shape and includes a plurality of teeth 144 on an outer periphery thereof. The outer teeth 144 are equidistantly spaced around the periphery to coincide with the teeth 130 on the outer periphery of the spindle ring gear 128. The outer end of the side shaft 134 also includes an outward extending support face 146 which includes a plurality of seals 149 to seal the actuator ring 116 from any dirt or contaminates found in the wheel environment. Any type of known seal 149 is placed between the side shaft 134 and the actuator unit 114 to prevent such ingress of contaminates. It should be noted that the appendage 136 of the side shaft 134 is formed directly into the side shaft 134 and may also be roll formed to further increase its strength. The appendage 136 also has a reduced dimension from the side shaft 134 outer face to increase the strength of the wheel end unit 10 unlike prior art devices that had a long extending appendage thus creating durability and strength problems within the wheel end unit 10.

The actuator ring 116 is arranged between an actuator arm 148 of the actuator unit 114 and the outer periphery teeth 144 of the side shaft 134. The actuator ring 116 includes a circular channel 150 running around the entire outer periphery of the ring 116 which mates with an appendage on the actuator arm 148. This will allow for the actuator ring 116 to have axial movement along the axis 118 of the wheel hub 10. On the inner circumference of the actuator ring 116 is a plurality of teeth 152 spaced equidistantly apart. The teeth 152 are formed such that they mate with and interact with the outer teeth 114 on the outer circumference of the side shaft 134 and with the teeth 130 on the outer circumference of the spline ring 128. When the vehicle is in a two-wheel drive only mode the actuator unit 114 will slide the actuator ring 116 such that the teeth 152 on the actuator ring 116 will mate with and only contact the teeth 144 on the outer periphery of the side shaft 134, thus disconnecting the wheel hub 122 from any rotative force of the drivetrain unit side shaft 134. When the vehicle operator selects to activate the front wheels a four-wheel drive unit actuator switch is moved such that the actuator unit 114 will receive an electronic signal and then slide the actuator arm 148 in an outward direction towards the wheel such that the actuator ring 116 engages both the teeth 144 on the outer circumference of the side shaft 134 and the teeth 130 on the outer circumference of the spline ring 128. This will rotatably fix the wheel hub 122 and spindle 120 unit to the side shaft 134 thus spinning the wheel at the side shaft speed. This speed is developed from the differential, transmission and the engine of the automotive vehicle. The activation of the wheel end system 10 will apply a force to the wheel thus introducing rotative force and assisting the vehicle in exiting from any slip conditions or improving its traction during off road conditions. When the actuator unit 114 is placed in an off position and the wheel is not connected to the side shaft 134 the wheel hub 122 and wheel connected to the wheel hub 122 will roll along at hang on speed thus providing no rotative power or torque to the movement of the vehicle.

A fastener 154 is arranged between the neck portion 136 of the side shaft 134 and the spindle 120. In one embodiment the preferred fastener 154 is a shoulder bolt which has a predefined length of threads on one end thereof wherein those threads will mate with and be secured within the cylindrical cavity 138 of the neck portion 136 of the side shaft 134. The shoulder bolt 154 includes a cylindrical smooth portion 156 adjacent to the threaded portion and a nut 156 at the opposite end thereof. The shoulder bolt 154 is connected to the cylindrical cavity 138 of the neck portion of the side shaft 134 by inserting the shoulder bolt 154 through the inner bore 132 of the spindle 120, via the outer opening of the inner bore 132. The shoulder bolt 154 is then secured within the cylindrical cavity 138 by rotation of the bolt therein. A cap or other protective device 160 is placed over the nut 158 of the shoulder bolt 154 in a predefined recess area on the outer surface of the spindle 120.

The shoulder bolt 154 is rotatably supported within the spindle 140 by a bearing assembly 162. In one embodiment the bearing assembly 162 is a roller bearing assembly that has a plurality of rollers 164 between an inner and outer race of the bearing assembly 162. The nut 158 of the shoulder bolt 154 is either in contact with the outer surface of the bearing assembly 162 or with a surface of the spindle 120. As shown in FIG. 2, a nut 158 is in contact with the outer surface of the bearing assembly 162. The bearing assembly 162 ensures that the shoulder bolt 154 will rotate with the side shaft 134 of the drivetrain system. The use of the shoulder bolt 154 in the wheel end system 10 ensures a more robust connection between the wheel end system 10 and the side shaft 134. Thus, when the wheel is in a disconnect mode and rolling along at hang-on speed the shoulder bolt 154 will be rotating at the side shaft speed. When the actuator 114 is activated and rotatably connects the spindle 120 with the side shaft 134 the shoulder bolt 154 will still be rotating at the side shaft speed. It should be noted that different types of shoulder bolts 154 or even completely different fasteners may be used with different length threaded portions and different length smooth cylindrical portions. These design requirements will depend on the needs and the environment of the wheel end hub 10.

The use of the shoulder bolt 154 will reduce the weight of each wheel end system 10 by reducing the need for a long appendage from the side shaft as found in prior art wheel end hub devices. The current invention allows for a reduced neck portion side shaft and creates a more robust connection because of the shoulder bolt being used instead of just a clip ring as used in prior art devices. The reduce neck portion 136 of the side shaft 134 also simplifies assembly steps for the manufacturing workers trying to insert the spindle 120 onto the side shaft 134 in small work spaces and within the required time frame. It should be noted that generally all the parts discussed above are made of a metal or other hard material. However, it should be noted that plastic parts may also be used but in particular within the actuator unit and other sealing units to help reduce the weight and thus improve fuel economy of the automotive vehicle.

Figure 3:
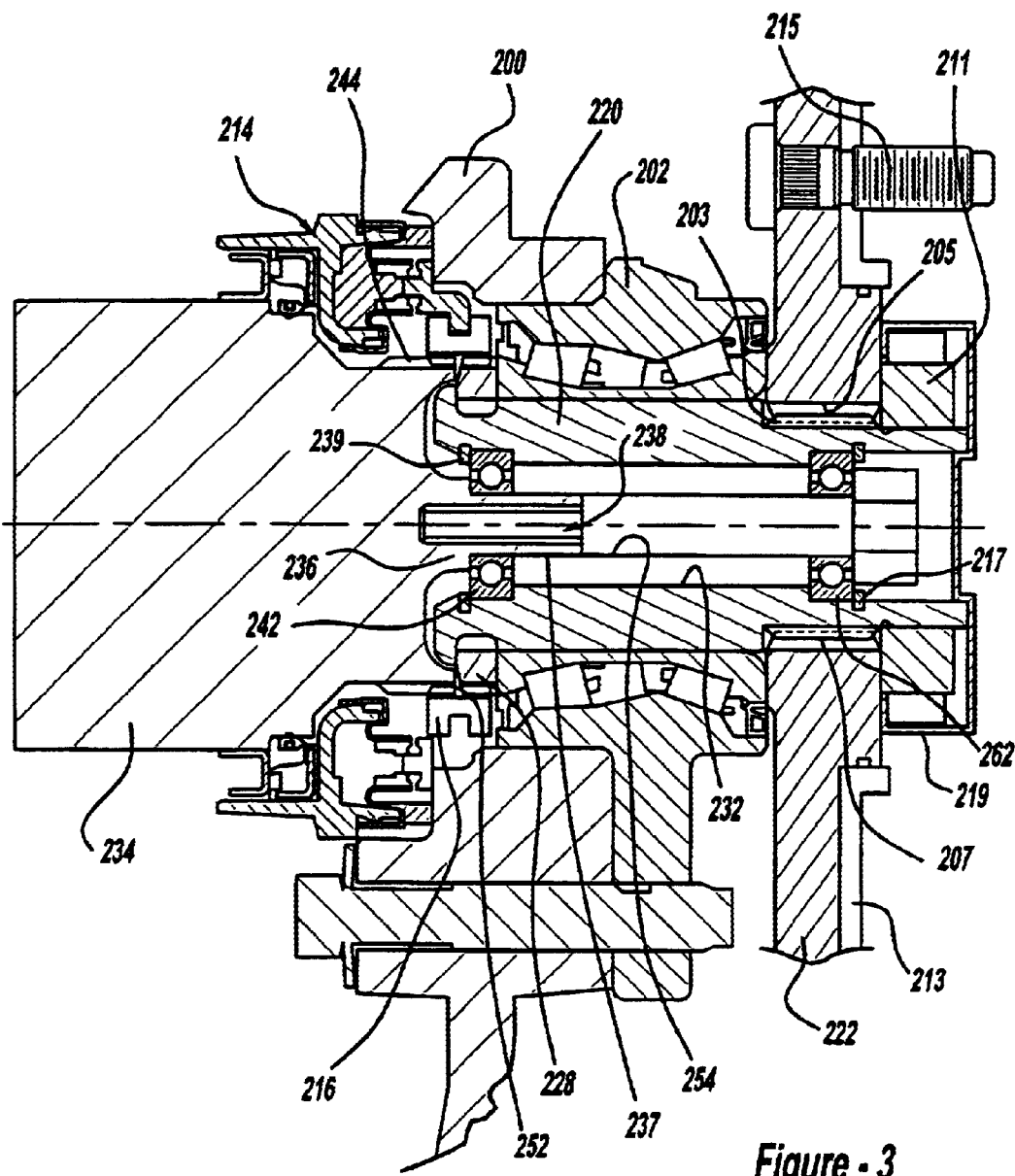
FIG. 3 shows a cross section of an alternate embodiment of a wheel end system according to the present invention.

FIG. 3 shows an alternate embodiment of the wheel end unit 10 according to the present invention. Like numerals indicate like parts The wheel end unit as shown in FIG. 3 operates and generally shares most of the same parts as that shown in FIG. 2 discussed above. The differences between the embodiment of FIG. 2 and 3 are as follows. In FIG. 3 the spindle 220 is rotatably arranged and supported within the bearing assembly 202 in the same manner as discussed above. The spindle 220 is a hollow cylindrical structure having a hollow cylindrical inner bore 232. The outer end of the spindle 220 includes a plurality of teeth 203 on an outer circumference thereof. These teeth 203 are spaced a predefined distance from the end of the outer side of the spindle 220. The wheel hub 222 in FIG. 3, is a separate unit that has an orifice 205 at its center point that includes a plurality of teeth 207 on an inner circumference of that orifice 205. The teeth 207 are arranged such that they mate and interact with the teeth 203 on the outer circumference of the spindle 220. Thus, the wheel hub 222 is placed on the spindle 220 after the spindle 220 is inserted onto the wheel end unit. The teeth 203, 207 will interengage thus creating a rotatably fixed connection between the wheel hub 222 and the spindle 220. A nut 211 or other type of compressive ring it is used to secure the wheel hub 222 to the spindle 220. As discussed above a wheel 213 is then connected to the spindle 220 via lug nuts and lugs 215 through the back end of the wheel hub 222. A shoulder bolt 254 is placed through the inner bore 232 of the spindle 220 such that it interacts with and is secured in the cylindrical cavity 238 within the neck portion 236 of the side shaft 234. The neck portion 236 does not have the reduced radius portion as found in the first embodiment. The bolt 254 is rotatably supported by a bearing assembly 262 within the spindle 220. Therefore, the bolt 254 will be rotatably fixed with respect to the side shaft 234 but will rotate relative to the spindle 220. The bearing assembly 262 is held in place by any known clip, fastener or spring device 217. An outer cover 219 is placed over the securing nut 211 and also the shoulder bolt 254 to ensure no contaminates enter and degrade the shoulder bolt connections with the spindle 220. The operation of the wheel end unit is exactly as described above. The use of the actuator unit 214 with the reduced neck portion side shaft 234 will reduce the weight and thus improve fuel economy for four-wheel drive vehicles and also create easier assembly processes thus reducing the amount of manufacturing time and cost needed to assemble the wheel end unit for the manufacturers.

In operation the vehicle operator will select a switch which will activate the transfer case to either engage the front wheels, and/or rear wheels depending on the configuration of the four-wheel drive system, or leave them in a disengaged state wherein the actuator ring 216 will be in sole contact with the teeth 244 on the outer circumference of the side shaft 234. If the operator selects engagement of the wheel then there will be an engagement of the outer teeth 244 of the side shaft 234 and the teeth of the spline ring 228 with the teeth 252 of the actuator ring 216 creating a rotational relationship between the side shaft 234 and the spline 220 thus creating rotative force to the wheel of the vehicle.

The present invention has been described an in illustrative manner. It is to be understood that the terminology which has been used is intended to be in the nature of words of description rather than of limitation.

Any modifications and variations of the present invention are possible in light of the above teaching. Therefore, within the scope of the appended claims, the present invention maybe practiced otherwise then as specifically described.

What is claimed is:

1. A wheel end for use in a vehicle, said wheel end including:
   a side shaft, said side shaft having an appendage on one end thereof, said side shaft having a cylindrical cavity in said appendage, said cylindrical cavity extending at least one quarter of the length of said appendage into said appendage;
   a spindle arranged around said appendage;
   a knuckle arranged around a portion of said spindle and a portion of said side shaft; and
   a fastener secured between said spindle and said appendage, said fastener rotatably supported within said spindle.

2. The wheel end of claim 1 wherein said fastener is a shoulder bolt.

3. The wheel end of claim 2 wherein said shoulder bolt is secured in said cavity on one end and in contact with said spindle or a bearing on an opposite end.

4. The wheel end of claim 3 wherein said appendage having a plurality of threads inside said cavity, said appendage having a reduced radius portion on an end thereof.

5. The wheel end of claim 2 wherein said shoulder bolt having a predetermined length.

6. The wheel end of claim 1 wherein said shoulder bolt is rotatably fixed with respect to said side shaft.

7. The wheel end of claim 1 further including a wheel hub, said wheel hub arranged around said spindle.

8. The wheel end of claim 1 wherein said spindle having a wheel hub integrated on one end thereof.

9. A wheel end disconnect system for use in a vehicle, said wheel end disconnect system including:
   a side shaft, said side shaft having a neck portion extending from one end thereof;
   a ring gear engaged with said side shaft;
   a support surrounding said side shaft and said ring gear;
   a spindle rotatably supported within said support;
   a spindle ring gear arranged near one end of said spindle; and
   a fastener arranged between said neck portion and said spindle.

10. The wheel end disconnect system of claim 9 wherein said fastener is a shoulder bolt.

11. The wheel end disconnect system of claim 10 wherein said neck portion having a cavity at an axis thereof, said cavity having a plurality of threads therein for receiving said shoulder bolt.

12. The wheel end disconnect system of claim 11 wherein sad shoulder bolt is in contact with said spindle or a bearing.

13. The wheel end disconnect system of claim 12 wherein said shoulder bolt is rotatably fixed with respect to said side shaft.

14. A method of connecting a wheel end unit to a side shalt for a vehicle, said method including the steps of:
   inserting a reduced neck portion of said side shaft within an inner bore of a spindle of said wheel end unit;
   supporting said reduced neck portion of said side shaft within said spindle by at least one bearing assembly; and
   securing said wheel end unit to said side shaft by a shoulder bolt engaging said reduced neck portion on one end thereof and said spindle or said bearing assembly on an opposite end of said shoulder bolt.

* * * * *

UNITED STATES PATENT AND TRADEMARK OFFICE
CERTIFICATE OF CORRECTION

PATENT NO. : 6,676,226 B2
DATED : January 13, 2004
INVENTOR(S) : Steven C. Hahn

It is certified that error appears in the above-identified patent and that said Letters Patent is hereby corrected as shown below:

Column 1,
Line 18, delete "maybe" and insert -- may be --.

Column 2,
Line 21, delete "fore going" and insert -- foregoing --.
Line 48, delete "accompany" and insert -- accompanying --.

Column 4,
Line 67, delete "radailly" and insert -- radially --.

Column 7,
Line 11, delete "it".

Column 8,
Line 50, delete "shalt" and insert -- shaft --.

Signed and Sealed this

Thirteenth Day of April, 2004

JON W. DUDAS
*Acting Director of the United States Patent and Trademark Office*